(12) United States Patent
Tedeschi et al.

(10) Patent No.: US 10,942,262 B2
(45) Date of Patent: Mar. 9, 2021

(54) SHARED APERTURE ANTENNA ARRAY

(71) Applicant: BATTLE MEMORIAL INSTITUTE, Richland, WA (US)

(72) Inventors: Jonathan R. Tedeschi, Richland, WA (US); A. Mark Jones, West Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 532 days.

(21) Appl. No.: 14/178,998

(22) Filed: Feb. 12, 2014

(65) Prior Publication Data

US 2015/0226846 A1  Aug. 13, 2015

(51) Int. Cl.
| | |
|---|---|
| *G01S 13/02* | (2006.01) |
| *H01Q 9/28* | (2006.01) |
| *H01Q 21/00* | (2006.01) |
| *G01S 7/03* | (2006.01) |
| *H01Q 21/06* | (2006.01) |
| *H01Q 9/04* | (2006.01) |
| *H01Q 21/24* | (2006.01) |

(52) U.S. Cl.
CPC ........... *G01S 13/02* (2013.01); *G01S 7/03* (2013.01); *H01Q 9/0435* (2013.01); *H01Q 9/285* (2013.01); *H01Q 21/0006* (2013.01); *H01Q 21/062* (2013.01); *H01Q 21/24* (2013.01); *G01S 2013/0254* (2013.01)

(58) Field of Classification Search
CPC .... G01S 13/02; G01S 7/03; G01S 2013/0254; H01C 9/0435; H01C 9/285; H01C 21/0006; H01C 21/062; H01C 21/24; H01Q 9/0435; H01Q 9/285; H01Q 21/0006; H01Q 21/062; H01Q 21/24

USPC ......................................................... 342/368
See application file for complete search history.

(56) References Cited

U.S. PATENT DOCUMENTS

| | | | | |
|---|---|---|---|---|
| 5,557,283 | A | | 9/1996 | Sheen et al. |
| 5,859,609 | A | | 1/1999 | Sheen et al. |
| 5,926,137 | A | * | 7/1999 | Nealy ................. H01Q 9/0407 343/700 MS |
| 5,973,641 | A | * | 10/1999 | Smith .................... H01Q 21/22 342/372 |
| 6,057,802 | A | * | 5/2000 | Nealy ................. H01Q 9/0407 343/700 MS |
| 6,504,516 | B1 | * | 1/2003 | Davis ...................... H01Q 3/26 342/368 |
| 8,284,101 | B2 | | 10/2012 | Fusco |
| 2001/0016762 | A1 | * | 8/2001 | Carr ...................... A61B 18/18 607/101 |

(Continued)

OTHER PUBLICATIONS

Buxton, C. G. Design of a Broadband Array Using the Foursquare Radiating Element, Jun. 12, 2001, Blacksburg, VA.

(Continued)

*Primary Examiner* — Frank J McGue

(74) *Attorney, Agent, or Firm* — Wells St. John P.S.

(57) ABSTRACT

A shared aperture antenna array including an array of antennas is disclosed. Elements of neighboring antennas are shared to create additional antennas. The shared elements include radiating patches and apertures. Each antenna shares an aperture with neighboring antennas. The array of antennas may be linear or two-dimensional. A phase shifting network with single-pole-single-throw reflective switches may be coupled to the antennas.

8 Claims, 3 Drawing Sheets

(56) References Cited

U.S. PATENT DOCUMENTS

| | | | | |
|---|---|---|---|---|
| 2003/0210207 A1* | 11/2003 | Suh | ......................... | H01Q 21/26 |
| | | | | 343/895 |
| 2009/0146893 A1* | 6/2009 | Mayes | ..................... | H01Q 5/00 |
| | | | | 343/751 |
| 2012/0003946 A1* | 1/2012 | Ono | ......................... | H01Q 3/30 |
| | | | | 455/115.1 |
| 2012/0280884 A1 | 11/2012 | DiNallo et al. | | |
| 2013/0044028 A1* | 2/2013 | Lea | ......................... | H01Q 21/24 |
| | | | | 342/359 |

OTHER PUBLICATIONS

Leung, M., et al., Wideband Dual Polarized Line Feed Development for a Cylindrical Reflector Radio Telescope, Antennas and Propagation Society International Symposium, 2007 IEEE, 1929-1932, Jun. 2007.

International Search Report/Written Opinion for International Application No. PCT/US2014/067942, International Filing Date Dec. 1, 2014, dated Aug. 3, 2015.

Kang, W., et al., Design of Shared-Arm Dipole Array for Imaging Radar Applications, Electronics Letters, 48, 2012, 951-953.

Kang, W., et al., Design of a Shared Arm Slot Array for Imaging Radar Applications, Antennas and Propagation, 2012 International Symposium, IEEE, Oct. 29, 2012, 854-857.

WO, PCT/US2014/067942 IPRP, Aug. 25, 2016, Battelle Memorial Institute.

Yan Fei, et al., "A Simple Wideband Dual-Polarized Array With Connected Elements", 2013 IEEE Antennas and Propogation Society International Symposium (Apsursi), IEEE, Jul. 7, 2013, pp. 1594-1595, United States.

EP, EP19211570.7 Extended SR & WO, Feb. 11, 2020, Battelle Memorial Institute.

Linden et al., "A Wideband, Dual-Polarized Connected Crossed-Dipole Scalable Array for SATCOM", The 2010 Military Communications Conference, Oct. 31, 2010, United States, pp. 353-356.

Riley et al., "Design and Modeling of Finite and Low-Profile, Ultra-Wideband Phased-Array Antennas", IEEE, Oct. 12, 2010, United States, pp. 484-491.

* cited by examiner

SHARED APERTURE ANTENNA ARRAY

STATEMENT REGARDING FEDERALLY SPONSORED RESEARCH OR DEVELOPMENT

This invention was made with Government support under Contract DE-AC05-76RLO1830 awarded by the U.S. Department of Energy. The Government has certain rights in the invention.

TECHNICAL FIELD

This invention relates to antenna arrays. More specifically, this invention relates to a shared aperture antenna array wherein elements or portions of neighboring antennas are shared to create additional antennas.

BACKGROUND OF THE INVENTION

Current technologies for linear and two-dimensional radar imaging antenna arrays use sequential sampling, synthetic apertures, and sparse array techniques to achieve sampling/pixel density. All of these techniques focus on switching networks to use antennas in the array as transmitters/receivers. For example, linear holographic radar imaging arrays typically use two separate linear arrays of cavity-backed spiral antennas to transmit and receive circularly polarized signals.

Microwave and millimeter-wave technologies or synthetic aperture imaging techniques have been developed for a wide variety of applications. These applications include radar (GPR), through-wall and inner wall imaging, body measurements, security screening, and non-destructive evaluation. The imaging techniques developed are fully three-dimensional and typically operate by scanning a wide bandwidth radar transceiver over a planar or cylindrical aperture, and using mathematical techniques to focus the data into a three-dimensional image. Examples of these techniques are described in U.S. Pat. Nos. 5,557,283 and 5,859,609 by Sheen et al. It is advantageous to use mathematical focusing for these applications because it allows for the use of large apertures and extreme near-field operation, where it would be inconvenient or impossible to use physical focusing elements such as lenses or reflectors. Additionally, scanning the transmitter along with the receiver doubles the resolution relative to fixed transmitters and provides superior illumination quality by using a large diversity of transmitters.

Many near-field radar imaging applications require real-time or near-real-time data collection and imaging. Sequentially-switched linear array technology that allows one dimension of a planar or cylindrical aperture to be effectively scanned electronically at high speed has been developed. This is accomplished by sequencing through each antenna element or transmit/receive antenna pair using microwave or millimeter-wave switching networks connected to the radar transceiver.

Phased array antenna systems are well known in the antenna art. Such antennas are generally comprised of radiating elements that are individually controllable with regard to relative phase and amplitude. The antenna pattern of the array is selectively determined by the geometry of the individual elements and the selected phase/amplitude relationships among the elements. Typical radiating elements for such antenna systems may include dipoles, patches, waveguides, or slots.

One example of a planar antenna element is known in the art as the Foursquare antenna, as described in U.S. Pat. No. 5,926,137 to Nealy. It comprises four square radiating elements on the top side of a dielectric substrate which is separated from a ground plane by a foam separator. At least two coaxial feeds connect to interior corners of opposing pairs of radiating elements. This Foursquare antenna provides wideband performance and several practical advantages for commercial and military applications. Various polarizations can be achieved with the Foursquare antenna—for example, dual linear, circular and elliptical polarizations of any orientation—and its features are a low-profile geometry and compact radiating element size.

The continuing challenge with the development of antenna arrays used in holographic imaging applications is to reduce the size and weight and achieve adequate physical sampling/pixel spacing in the array. The required sampling is typically a minimum of one-half wavelength. The physical sampling of the array is determined by the spacing of transmit and receive antennas used in the array system. Since the physical size of the antenna is constrained by the bandwidth of operation, the physical size of the antennas cannot be greatly reduced to achieve any noticeable increase in sampling density.

SUMMARY OF THE INVENTION

In accordance with one embodiment of the present invention, an antenna array is disclosed. The antennas array includes an array of antennas wherein elements of neighboring antennas are shared to create additional antennas.

The shared elements include radiating patches and apertures. Apertures of neighboring antennas overlap.

In one embodiment, feed points of the antennas are phased so that opposing dipole patches are 180 degrees out of phase.

In one embodiment, each antenna is a foursquare antenna.

The antennas are printed on a dielectric substrate and located above a ground plane.

The antenna array includes a phase shifting network with single-pole-single-throw reflective switches coupled to the antennas.

The array of antennas is a linear array of antennas or a two-dimensional array of antennas.

In another embodiment of the present invention, a shared aperture antenna array is disclosed. The shared aperture array includes an array of antennas. Each antenna shares an aperture with neighboring antennas.

In another embodiment of the present invention, a method of increasing sampling density using a shared aperture antenna array is disclosed. The method includes providing an array of antennas; and creating additional antennas by sharing elements of neighboring antennas within the array.

In one embodiment, the method includes electrically coupling a phase shifting network with single-pole-single-throw reflective switches to the antennas.

In another embodiment of the present invention, a shared aperture antenna array is disclosed. The shared aperture array includes an array having a plurality of antennas wherein each antenna shares at least one radiating patch and an aperture with a neighboring antenna. At least one feed point is phased so that opposing dipole patches are 180 degrees out of phase. The antennas are printed on a dielectric substrate and located above a ground plane.

DETAILED DESCRIPTION OF THE PREFERRED EMBODIMENTS

The present invention describes an array of antennas that shares components or elements of neighboring antennas to create additional antennas. The shared aperture array creates additional antenna elements within an array of broadband planar dipole antennas, allowing for increased array sampling and pixel density than current antenna array designs. The shared aperture array can achieve pixel sampling distances much smaller than one-half wavelength with a single array of antennas. The sharing of elements of neighboring antennas to create additional antennas reduces the physical size of the arrays by a factor of two, allows for fully polarimetric data sets with a single array, increases the physical sampling—reducing pixel sampling in the array—to one-twelfth of a wavelength, and enables imaging systems with reduced weight.

In one embodiment, the present invention discloses an array of broadband planar dipoles and maintains desirable circular polarization properties of transmitted and received signals using an appropriate feed network.

Figure 1:
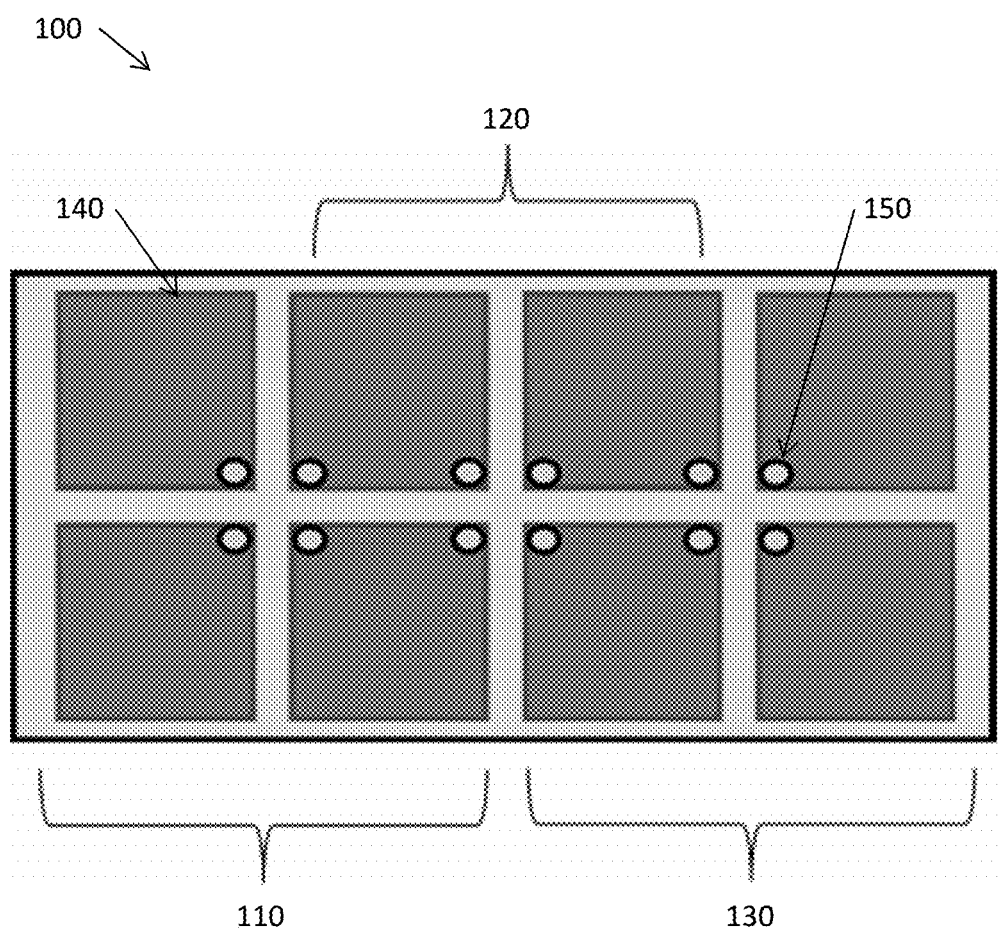
FIG. 1 is a schematic of a shared aperture antenna linear array, in accordance with one embodiment of the present invention.

FIG. 1 is a schematic of a shared aperture antenna array 100, in accordance with one embodiment of the present invention. The antenna array 100 includes a first antenna 110, a second antenna 120, and a third antenna 130. In this embodiment, each antenna 110, 120, and 130 is a foursquare antenna that includes four radiating patches or metal sheets 140. Each radiating patch 140 includes at least one feed point 150. It should be noted that the antenna array 100 is not limited to any particular number of antennas, radiating patches or feed points. Note also that the antenna array can be a single (linear) or a two-dimensional array of antennas.

In the present invention, certain elements or components of the antenna array are shared. The shared elements include the radiating patches 140 and apertures. For example, in FIG. 1, the radiating patches 140 of the first antenna 110 and the third antenna 130 are shared to create the second antenna 120. As such, the same radiating patch is used for two antennas, and two radiating patches belong to two antennas. This is achieved without changing the physical size of the array 100. The number of antennas is increased as the radiating patches of neighboring antennas are shared. This results in having nearly twice as many antennas in the same space compared to current or prior antenna array designs.

Apertures of neighboring antennas also overlap. Still referring to FIG. 1, the first antenna 110 has an aperture consisting of its four radiating patches. Likewise, the second and third antennas 120 and 130 each have apertures above them. However since the first antenna 110 and the second antenna 120 overlap, they have a shared aperture. Similarly, since the second and third antennas 120 and 130 overlap, they also share an aperture. Each antenna shares an aperture with neighboring antennas.

Figure 2:
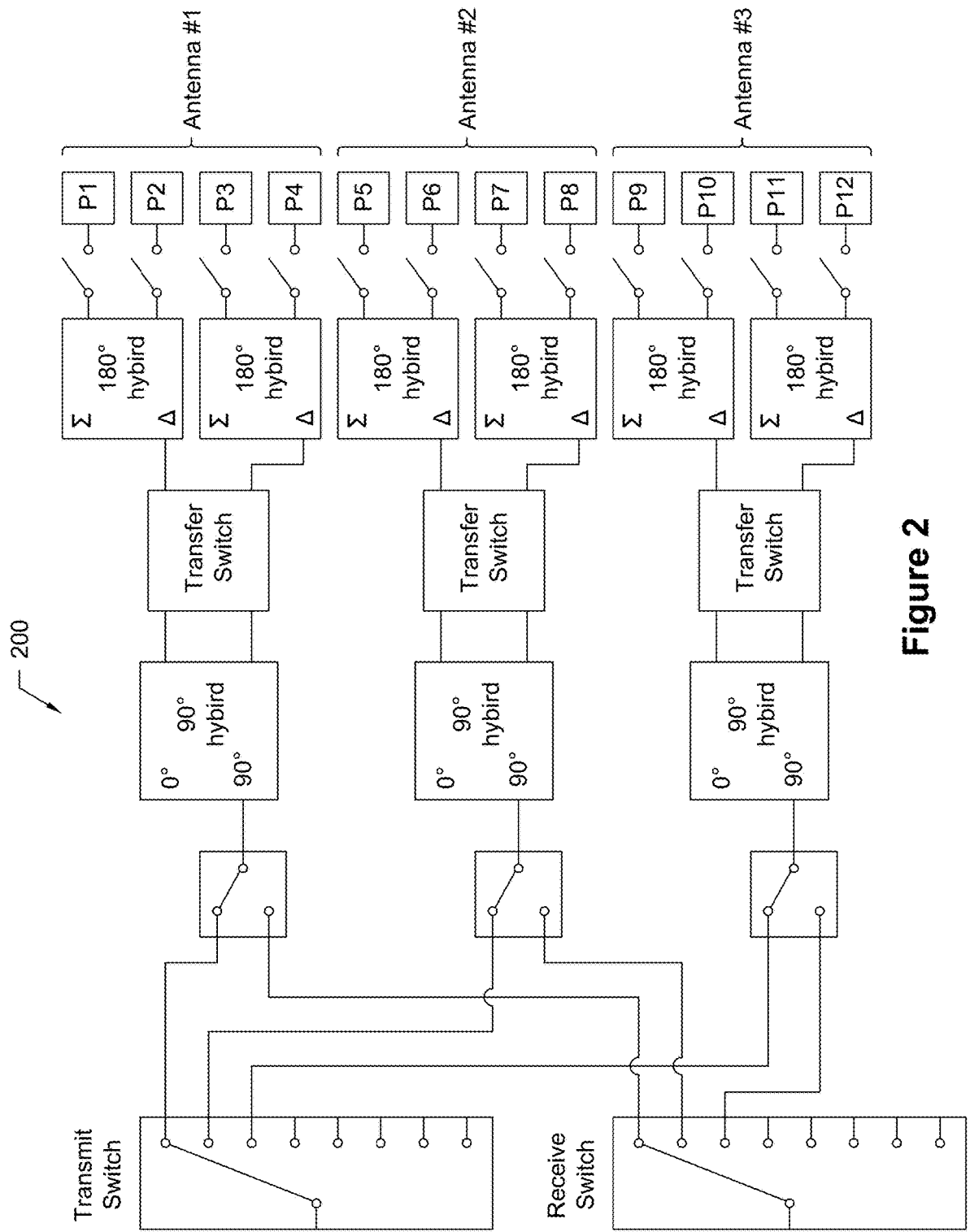
FIG. 2 is a schematic of a phase shifting network coupled to antennas, in accordance with one embodiment of the present invention.

FIG. 2 is a schematic of a phase shifting network 200 coupled to antennas using single-pole-single-throw reflective switches, in accordance with one embodiment of the present invention. The network 200 includes two separate 180 degree hybrids or baluns plus a separate 90 degree hybrid for each antenna. The feed points of each antenna are coupled to the 180 degree hybrid couplers via single-pole-single-throw reflective switches. A transfer switch is coupled between the difference signal outputs of the 180 degree hybrid couplers and the 90 degree hybrid coupler, which is used to produce circular polarization. A second switch is coupled between the 90 degree output port and a transceiver—the transmit switch and the receive switch—which is used for generating signals to be transmitted and processing received signals. In one embodiment, the array transmits with right-hand circular polarization (RHCP) and receives with left-hand circular polarization (LHCP).

Figure 3:
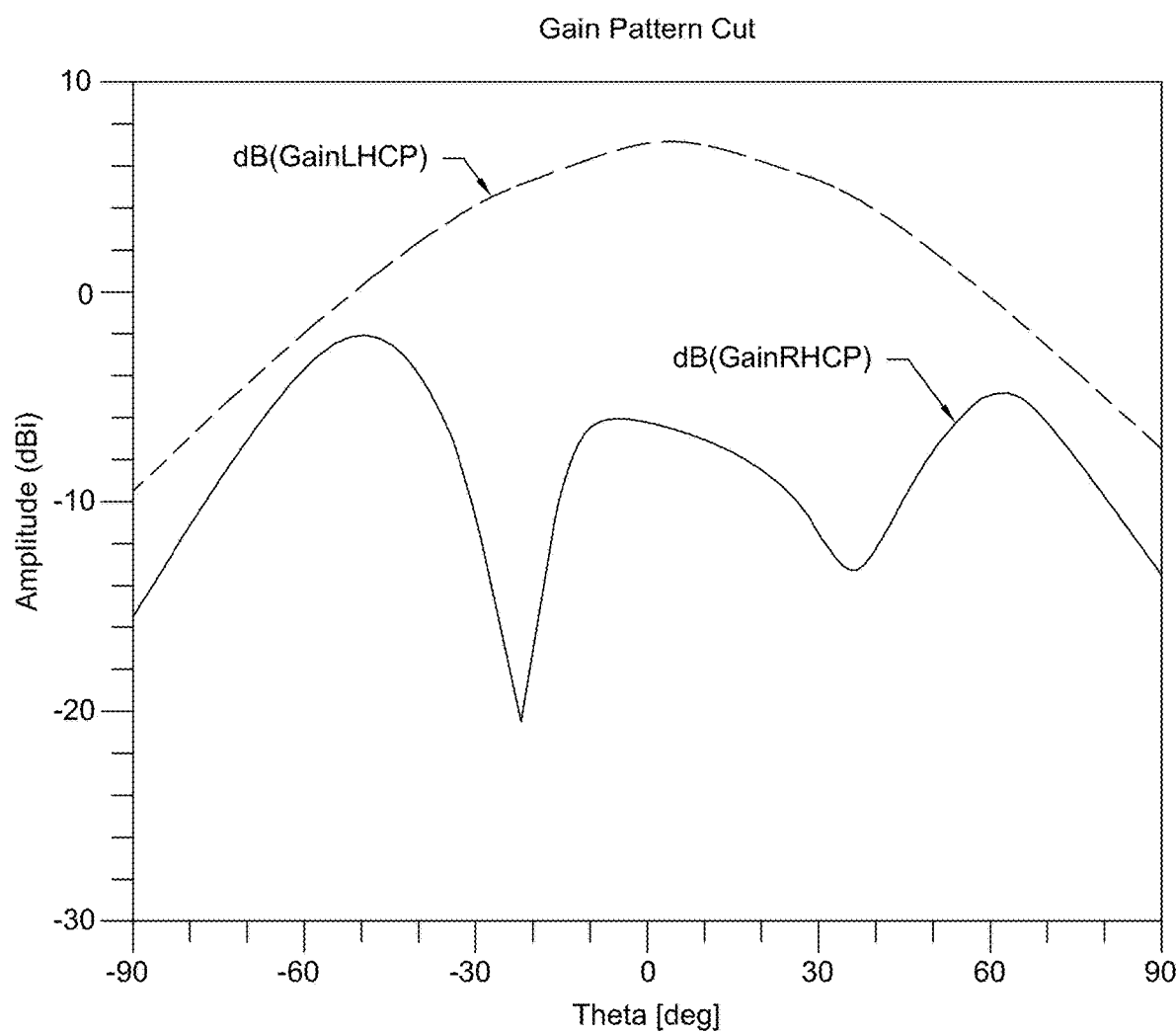
FIG. 3 is a graph showing antenna gain using the shared aperture antenna array of FIG. 1.

The antenna array of the present invention was simulated and verified using a finite element model of a planar broadband foursquare patch/dipole array with a center frequency of approximately 10 GHz. FIG. 3 is a graph showing the antenna gain using this array configuration, which is similar in design to the antenna array of FIG. 1.

Results of the simulation demonstrated the following: an increased sampling/pixel density—e.g., one-twelfth wavelength sampling, which is 3-6× better than existing array designs—reduced array surface by 50%, the ability to utilize co-polarized and cross-polarized signals with a single array, and antenna gain by approximately 5 dB relative to cavity-backed spiral array designs.

Antenna geometries and feed network components are frequency scalable, so this design may be used over the RF, microwave, and mm-wave spectrums. The performance of the linear antenna array can be extrapolated using an infinite array model of the shared aperture antenna used in a 2-D antenna array configuration.

The shared aperture antenna array of the present invention was able to maintain the desired antenna gain, voltage standing wave ratio (VSWR), and circular polarized properties of the baseline antenna by employing a reflective switch at the input to the shared ports of the foursquare antenna patches to appear as a short-circuit when the element was not being used.

The shared aperture antenna array demonstrated the ability to obtain both right-handed and left-handed senses of circular polarization using only a single array of antennas. Sampling configurations within the array allow for improved physical sampling within the antenna array as small as one-twelfth of a wavelength.

The present invention is applicable to any frequency band via frequency scaling of the physical antenna dimensions.

Applications involving linear and 2-D holographic radar arrays include, but are not limited to the following: security screening, handheld holographic imaging systems, ground penetrating radar (GPR), and clothing/apparel measurements.

The shared aperture array allows for increased physical sampling throughout the antenna array, which results in high-fidelity and multiple polarization state based images. High-fidelity images in conjunction with multiple polarization state data sets can increase the probability of detection of threat objects and improve the accuracy for apparel measurements.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention.

We claim:

1. A linear antenna array comprising: at least a pair of antennas printed on a dielectric substrate and located above a ground plane, each of the antennas having at least a pair of radiating patches to provide at least four radiating patches between the pair of antennas, wherein at least one of the pair of radiating patches of one antenna is shared with at least another of the pair of radiating patches of the other antenna to form a third antenna, and wherein each of the shared patches comprises at least two feed points located at respective corners of the individual patch.

2. The linear antenna array of claim 1 wherein feed points of the shared patches are phased to configure opposing patches 180 degrees out of phase.

3. The linear antenna array of claim 1 wherein each of the antennas is a foursquare antenna.

4. The linear antenna array of claim 3 wherein one pair of patches of one foursquare antenna is shared with another pair of patches of another abutting foursquare antenna to form a third foursquare antenna.

5. The linear antenna array of claim 1 further comprising a phase shifting network having single-pole-single-throw reflective switches operatively coupled to each of the individual ones of the antennas.

6. The linear antenna array of claim 4 wherein each of the pair of patches includes a pair of feed points.

7. The linear antenna array of claim 1 wherein each of the pair of antennas is configured as a foursquare antenna having one pair of patches of one foursquare antenna abutting another pair of patches of the other foursquare antenna; and a first feed point in a first patch of the one pair of patches of the one foursquare antenna, a second feed point in a second patch of the one pair of patches of the one foursquare antenna, a third feed point in a first patch of the other pair of patches of the other foursquare antenna and a fourth feed point in a second patch of the other pair of patches of the other foursquare antenna.

8. The linear antenna array of claim 7 wherein at least one radiating patch of the one pair of radiating patches of the one foursquare antenna is shared with at least another radiating patch of the other pair of radiating patches of the other foursquare antenna to form a third antenna.

* * * * *